(12) United States Patent
Zimmermann et al.

(10) Patent No.: US 12,306,985 B2
(45) Date of Patent: May 20, 2025

(54) METHOD AND SYSTEM FOR DETECTION AND PROTECTION OF PERSONAL DATA IN AUTONOMOUS DRIVING

(71) Applicant: Robert Bosch GmbH, Stuttgart (DE)

(72) Inventors: Christian Zimmermann, Stuttgart (DE); Sven Trieflinger, Renningen (DE); Stefan Gehrer, Pittsburgh, PA (US)

(73) Assignee: Robert Bosch GmbH (DE)

( * ) Notice: Subject to any disclaimer, the term of this patent is extended or adjusted under 35 U.S.C. 154(b) by 198 days.

(21) Appl. No.: 17/838,918

(22) Filed: Jun. 13, 2022

(65) Prior Publication Data

US 2023/0409735 A1   Dec. 21, 2023

(51) Int. Cl.

| | |
|---|---|
| *G06F 21/62* | (2013.01) |
| *G06V 10/764* | (2022.01) |
| *G06V 20/59* | (2022.01) |
| *G06V 40/10* | (2022.01) |

(Continued)

(52) U.S. Cl.
CPC ........ *G06F 21/6245* (2013.01); *G06V 10/764* (2022.01); *G06V 20/59* (2022.01);
(Continued)

(58) Field of Classification Search
CPC ...... G06V 40/10; G06V 20/59; G06V 10/764; G06F 21/6245; G07C 5/00; G07C 5/008; H04W 12/02
See application file for complete search history.

(56) References Cited

U.S. PATENT DOCUMENTS

| 10,169,608 B2 | 1/2019 | Van Dyne et al. |
| 10,223,508 B2 | 3/2019 | Berger et al. |

(Continued)

FOREIGN PATENT DOCUMENTS

| CN | 111885544 B | * 12/2023 | ........... H04L 63/045 |
| JP | 2015075150 A | * 4/2015 | |
| WO | WO-2016054767 A1 | * 4/2016 | ........... B60R 16/023 |

OTHER PUBLICATIONS

"Vulnerable Road User Protection"—5GAA, Aug. 24, 2020 https://5gaa.org/content/uploads/2020/08/5GAA_XW3200034_White_Paper_Vulnerable-Road-User-Protection (Year: 2020).*

(Continued)

*Primary Examiner* — Randy A Scott
(74) *Attorney, Agent, or Firm* — Dickinson Wright PLLC (57) ABSTRACT

Methods and systems of leveraging multiple data-collection entities to protect personal data. Image data is captured via an image sensor of a vehicle. A classifier can partition the captured image data into personal data and non-personal data, and can assign a confidence score to the personal data. If the confidence score is below a threshold, the vehicle can broadcast a wireless signal to other data-collection entities such as other vehicles or road-side unit, wherein the wireless signal includes a request for the other data-collection entities to inform the vehicle if those data-collection entities have detected personal data at a time corresponding to when the image sensor of the vehicle captured the image data. If the other data-collection entities indeed detected such personal data at the time, the vehicle can perform various actions such as deleting the images, or the portions that include personal data.

20 Claims, 5 Drawing Sheets

(51) Int. Cl.
*G07C 5/00* (2006.01)
*H04W 12/02* (2009.01)

(52) U.S. Cl.
CPC .............. *G06V 40/10* (2022.01); *G07C 5/00* (2013.01); *G07C 5/008* (2013.01); *H04W 12/02* (2013.01)

(56) References Cited

U.S. PATENT DOCUMENTS

| | | | |
|---|---|---|---|
| 10,438,020 | B2 | 10/2019 | Barday et al. |
| 10,824,758 | B2 | 11/2020 | Hankeln et al. |
| 10,878,127 | B2 | 12/2020 | Brannon et al. |
| 12,024,103 | B2 * | 7/2024 | Schindler ................ G06F 21/32 |
| 2020/0098049 | A1 * | 3/2020 | Jack ................... G06F 21/6245 |
| 2021/0141931 | A1 | 5/2021 | Brannon et al. |

OTHER PUBLICATIONS

"Privacy Protection a Must for Driver Monitoring"—Ann Mutschler, Semiconductor Engineering, Apr. 1, 2021 https://semiengineering.com/privacy-protection-a-must-for-driver-monitoring/ (Year: 2021).*

Website for "Computer Vision", Wikipedia, https://en.wikipedia.org/wiki/Computer_vision, retrieved on Apr. 25, 2022, 17 pages.

Website for "Gait analysis", Wikipedia, https://en.wikipedia.org/wiki/Gait_analysis, retrieved on Apr. 25, 2022, 9 pages.

Wolf et al., "Face Recognition in Unconstrained Videos with Matched Background Similarity", Israel, 6 pages.

Website for UMTS, Wikipedia, https://en.wikipedia.org/wiki/UMTS, retrieved on Apr. 25, 2022, 24 pages.

Website for "ITS & Vulnerable Road Users", https://transport.ec.europa.eu/transport-themes/intelligent-transport-systems/road/action-plan-and-directive/its-vulnerable-road-users_en#:~:text=Vulnerable%20Road%20Users%20(VRU)%20are,or%20reduced%20mobility%20and%20orientation%22., retrieved on Apr. 25, 2022, 4 pages.

Linget, "Vulnerable Road User Protection", 5GAA Automotive Association, 2020, 27 pages.

Website for "Intel SGX", https://www.intel.de/content/www/de/de/architecture-and-technology/software-guard-extensions.html, retrieved on Apr. 19, 2022, 10 pages.

* cited by examiner

METHOD AND SYSTEM FOR DETECTION AND PROTECTION OF PERSONAL DATA IN AUTONOMOUS DRIVING

TECHNICAL FIELD

The present disclosure relates to methods and systems for detecting and protecting personal data in an autonomous driving setting.

BACKGROUND

Private and/or public (e.g., government) entities may desire to use data gathered by cameras and the like for a variety of purposes. In some instances, this data may contain personal data, such as personally identifiable information (PII). Improper handling of this data may violate local, regional, or global privacy laws—such as the General Data Protection Regulation (GDPR) or the California Consumer Privacy Act (CCPA).

SUMMARY

According to an embodiment, a method of leveraging multiple data-collection entities to protect personal data includes capturing image data via an image sensor of a vehicle; via a classifier, partitioning the captured image data into personal data and non-personal data; via the classifier, assigning a confidence score to the personal data; in response to the confidence score being below a threshold, broadcasting a wireless signal to one or more other data-collection entities, wherein the wireless signal includes a request for the one or more other data-collection entities to inform the vehicle if the one or more data-collection entities has detected personal data at a time corresponding to when the image sensor of the vehicle captured the image data; and in response to the one or more other data-collection entities indicating it has detected personal data at the time, performing one or more pre-defined actions at the vehicle.

In another embodiment, a system for leveraging multiple data-collection entities to protect personal data includes a first data collection entity including (i) a first image sensor configured to capture first images of a first scene, and (ii) a first processor programmed execute a first classifier to process first image data associated with the first images and partition personal data from non-personal data associated with the first image data. The system also includes a second data collection entity including (i) a second image sensor configured to capture second images of a second scene, and (ii) a second processor programmed execute a second classifier to process second image data associated with the second images and partition personal data from non-personal data associated with the second image data. The first processor is programmed to: (i) broadcast, to the second data collection entity, a wireless message including a request for the second data collection entity to indicate whether the second processor detected personal data at a particular time specified by the first processor, (ii) in response to the second data collection entity indicating that no personal data was detected at the particular time, perform a first predefined action, and (iii) in response to the second data collection entity indicating that personal data was detected at the particular time, perform a second predefined action.

In yet another embodiment, A non-transitory computer-readable medium comprising a plurality of instructions that, when executed by one or more processors of a first data collection entity, cause the one or more processors to perform the following: capture image data via an image sensor; via a classifier, partition the captured image data into personal data and non-personal data; via the classifier, assign a confidence score to the partitioned personal data; in response to the confidence score being below a threshold, broadcast a wireless signal including a request for one or more other data collection entities to inform the first data collection entity whether personal data has been detected by the one or more other data collection entities at a particular time designated by the first data collection entity; and in response to the one or more other data collection entities indicating the presence of personal data at the particular time: (i) agree with the one or more other data collection entities on a trusted third party, (ii) send the image data from the first data collection entity to the trusted third party for partitioning into personal data and non-personal data, and receive results of the partitioning from the trusted third party.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

This disclosure includes a description of "personal data." The term "personal data" may refer to one or more of the following: any information relating to an identified or identifiable natural person; an identifiable natural person is one who can be identified, directly or indirectly, in particular by reference to an identifier such as a name, an identification number, location data, an online identifier or to one or more factors specific to the physical, physiological, genetic, mental, economic, cultural or social identity of that natural person. Personally identifiable information (PII) is a non-limiting example of personal data. A natural person may refer to an individual human being having his or her own legal personality (whereas e.g., a legal person herein may refer to an individual human being, a private organization (e.g., a business entity or a non-governmental organization), or public organization (e.g., a government entity)). Thus, for example, personal data may refer to address information associated with a specific identified or identifiable natural person, neighborhood or locality information associated with a specific identified or identifiable natural person, an address number associated with the at least one identified or identifiable natural person, biometric information (e.g., fingerprints, DNA, retina and facial images, walking gate, etc.) associated with a specific identified or identifiable natural person, physical features of the at least one identified or identifiable natural person, vehicle information (e.g., license plate information) associated with a specific identified or identifiable natural person, image data or video data associated with a specific identified or identifiable natural person (e.g., wherein video data comprises a sequence of images), or the like.

Such personal data may be captured by one or more sensors. Non-limiting examples of sensors include: a light detection and ranging (lidar) sensor, a digital camera sensor (e.g., detecting light in and around the visible spectrum), an infrared camera, a short-, medium-, or long-range thermal imaging sensor, a millimeter radar sensor, a sonar sensor (e.g., an ultrasonic sensor), distance sensor for producing range imaging, motion sensor, thermal imaging camera, or any other type of sensor that produces associated data that can include personal data. References to an "input image" or "image sensor" herein is not necessarily from a camera, but can be from any of the above-listed sensors. For example, the output of a sonar sensor can be processed to produce a visible image of an object, and thus the sonar sensor is an image sensor.

Images sensors such as those described above can be used by vehicles, for example in an autonomous or semi-autonomous driving system. Such image sensors can be used to detect vulnerable road users (VRUs) (such as pedestrians, bicyclists, motorcyclists) and act accordingly. For example, in response to the vehicle detecting a VRU in the vicinity, the vehicle may act different such as by slowing down, giving more space between the vehicle and the VRU, or the like. In certain circumstances, a vehicle's image sensors alone may not be sufficient to accurately detect the presence of a VRU. For example, the VRU may be obstructed from view of the vehicle by a building, another vehicle, a tree, or the like. Or, the VRU may not be in the line of sight of the vehicle.

Non-personal data may refer to data that is not personal data. Continuing with the example of a vehicle, sensors of vehicle may receive a combination of personal and non-personal data (e.g., referred to herein as unsegregated data). For example, a camera sensor of vehicle may not filter out all personal data from an image but instead the personal and non-personal elements often may be captured together—e.g., when a leading vehicle (ahead of the vehicle) is imaged, a license plate identifier of the leading vehicle is typically captured concurrently; the leading vehicle may not be personal data, whereas the license plate identifier may be personal data.

During times in which it may be difficult for the vehicle to accurately detect the presence of a VRU, it may also be difficult for the vehicle (or connected system) to determine personal data associated with the VRU. This may hinder systems that protect the captured personal data by, for example, partitioning the personal data from non-personal data and processing the personal data in a dedicated, secure system. If the vehicle is unable to accurately detect the VRU and/or its associated personal data, the associated system that processes the data may have difficulty accurately detecting the presence of personal data; this may cause the system to over-designate image data as being personal data when it is actually not personal data. Furthermore, an increase of quality of understanding what is personal data and what is non-personal data in any images captured and processed can allow for better compliance with privacy regulations, such as the General Data Protection Regulation (GDPR) and the California Consumer Privacy Act (CCPA).

Therefore, the present disclosure provides various embodiments of systems and methods for improving personal data identification in the context of processing of image data associated with vehicle systems such as autonomous driving. The vehicle can communicate with other vehicles or other data-collection entities (such as road-side units (RSUs)) that may have a better (e.g., unobstructed, clearer) view of the VRU. The vehicle can leverage communication and fusion methods employed for collaborative sensing between the vehicle and the other vehicles or RSUs to increase quality of partitioning of personal data and non-personal data from the image data.

Figure 1:
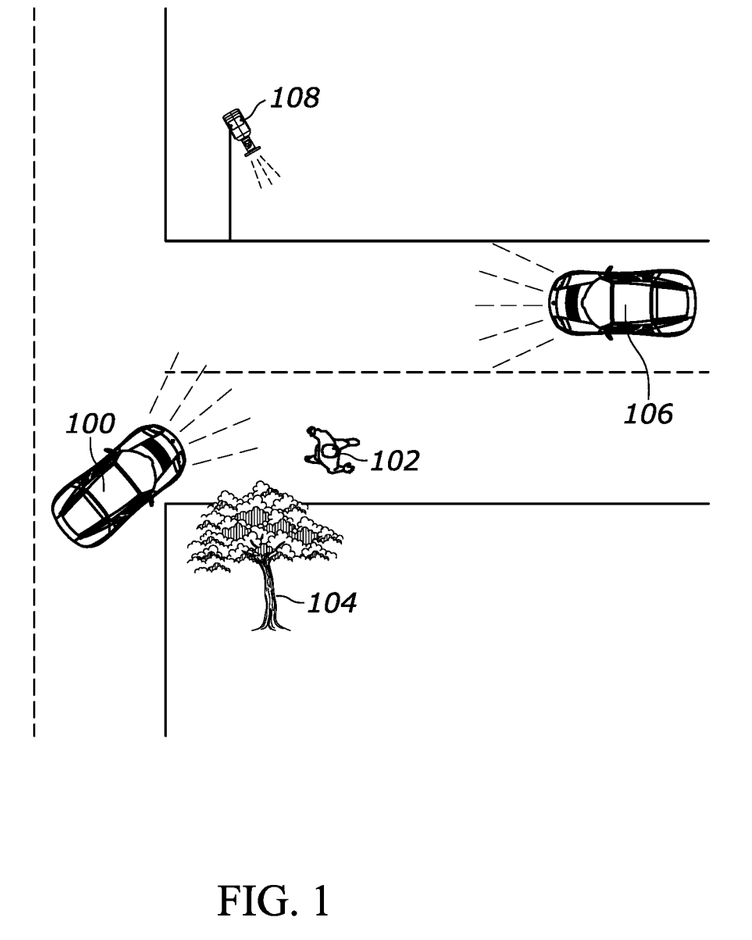
FIG. 1 is an overhead view of a vehicle collaborating with other data-collection entities (such as another vehicle and a road side unit) to detect the presence of a vulnerable road user such as a pedestrian, according to an embodiment.

For example, as shown in FIG. 1, a vehicle 100 equipped with one or more image sensors configured to detect a VRU 102—in this embodiment, a pedestrian walking on the road. In the event the VRU 102 is in an obstructed area (e.g., behind a tree 104 from the viewpoint of the vehicle 1), or in the event the vehicle 100 cannot accurately and/or reliably detect the VRU 102, the vehicle 100 can communicate with another vehicle 106, a RSU 108, or other data-collection entities that may have a better view of the VRU 102 and thus can better detect the VRU via their associated image sensors. The vehicle 100 and/or RSU 108 can communicate the presence of the VRU 102 and/or personal data associate with the VRU 102, thus allowing the vehicle 100 to correspondingly treat the detected object as a VRU 102 and treat any associated personal data accordingly (e.g., partitioning of the personal data, etc.).

The partitioning of personal data and non-personal data may be performed within the vehicle according to the teachings provided herein. Alternatively, the partitioning may be performed in a backend system or an edge-based system. In that scenario, the vehicle can send its image data to the backed system and the backend system (rather than the vehicle) performs the partitioning and the methods described herein.

Figure 2:
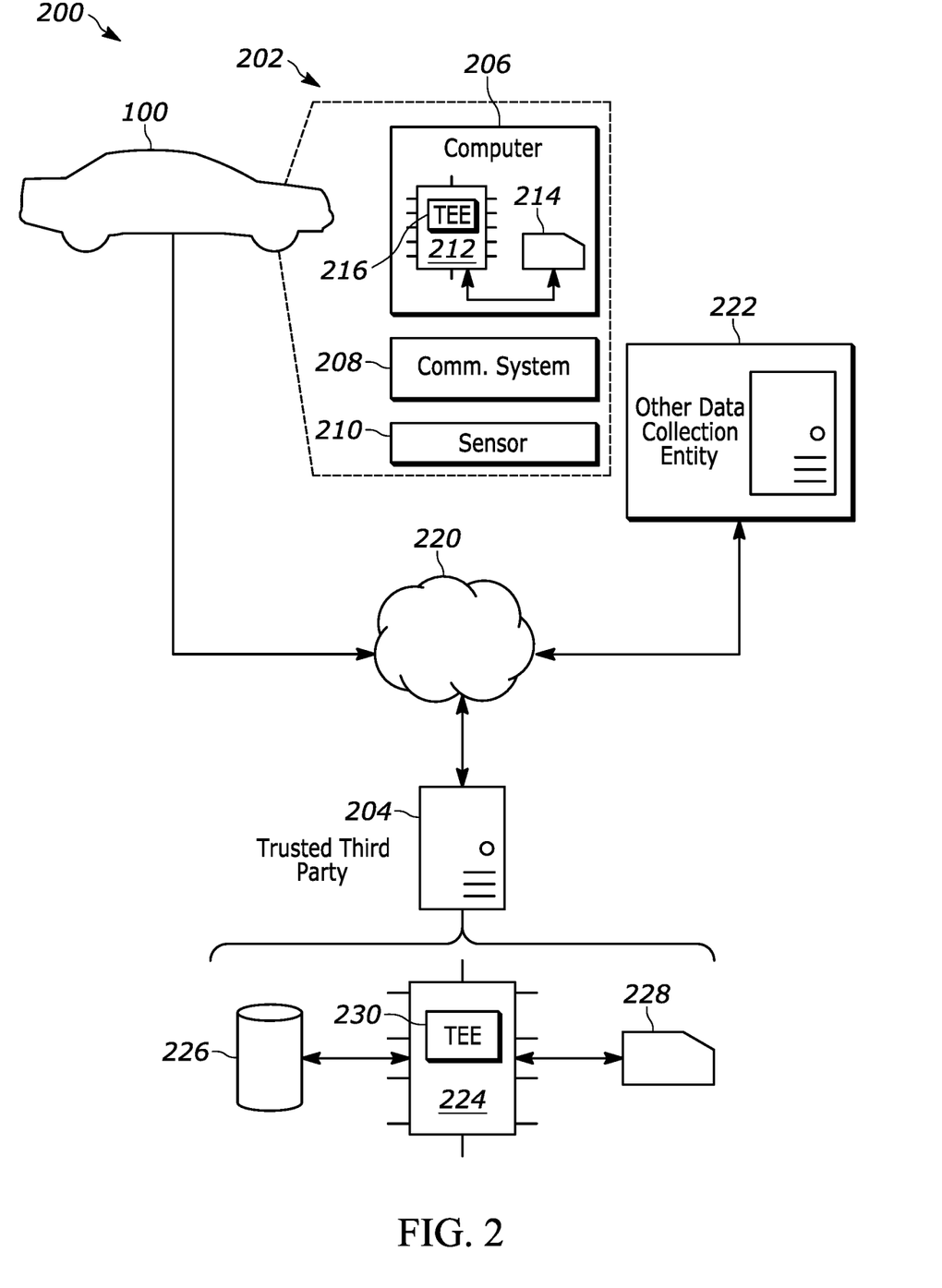
FIG. 2 is a schematic diagram illustrating an example of a data privacy system including a local computer system that collects and protects data, in communication with one or more other data collection entities and a trusted third part for further processing and protection of the data, according to an embodiment.

FIG. 2 illustrates a data privacy system 200 that may comprise a local computer system 202 (also referred to as a data collection system) in communication with a backend computer system 204 (also referred to as an additional data protection system). Here, one backend computer system is shown; however, more or fewer may be used instead. The data privacy system 200 is configured to perform the steps disclosed herein, with the local computer system 202 and backend computer system 204 each having their own specific role in protecting the personal data that may be collected. The local computer system 202 may be provided on the vehicle 100, and may include image sensors, processors, and the like that are on-board the vehicle.

The local computer system 202 and backend computer system 204 gather multitudes of data of objects—including humans (e.g., natural persons)—during the course of their operations. This data may be used for various reasons—e.g., in some instances, the data may be used by engineers to improve vehicle computing systems at a backend facility (e.g., such as advanced driving systems which enable partially or fully autonomous driving modes—e.g., in accordance with Level 1, Level 2, Level 3, Level 4, and Level 5, as defined by the Society of Automotive Engineers (SAE)). For example, simulation and training of developed software may better be implemented when real-life scenarios are used as input. Current data privacy laws however may prevent the use of some of this data—e.g., if the data comprises personal data (e.g., such as personally identifiable information (PII)). The data privacy system 200 enables collection and protection of both personal and non-personal data consistent with developing privacy laws such as the GDPR and the CCPA. More particularly, system 200 facilitates protecting personal data using, among other things, a Multi-Party Computation (MPC) framework, a Trusted Execution Environment (TEE), or both. It should be appreciated that though the disclosure below uses vehicle 100 (which may collect data while operating in at least one autonomous driving mode) to illustrate a local data collection system 202, other data collection systems are possible—e.g., such as other uses of cameras or other sensors mounted to infrastructure (e.g., whether or not sensors are being used in connection with autonomous driving or not).

For example, the local computer system 202 may include, among other things, a computer 206, a communication system 208, and one or more sensors 210. The computer 206 may facilitate the collection of unsegregated data, some processing of the data, and the communication of that data to the backend computer system 204. The computer 206 may comprise one or more processors 212 and memory 214. The processor 212 may include a trusted execution environment (TEE) 216 as will be further described below.

The computer 206, communication system 208, and sensor 210 may collectively be referred to as a local computer system 202, or data generation system. The physical outlay or arrangement of the computer 206, communication system 208, and sensor 210 can vary, but are all local to one another. For example, they can be housed within a single, common housing (e.g., vehicle 100).

The processors 212 may refer to one processor or multiple processors, and may be any suitable device that controls sensor(s) 210 and/or communication system 208. Processor(s) 212 may be programmed to process and/or execute digital instructions to carry out at least some of the tasks described herein. Non-limiting examples of processor(s) 212 include one or more of: a microprocessor, a microcontroller or controller, an application specific integrated circuit (ASIC), a field-programmable gate array (FPGA), one or more electrical circuits comprising discrete digital and/or analog electronic components arranged to perform predetermined tasks or instructions, etc.—just to name a few. In at least one example, processor(s) 212 is configured to read from memory 214 and/or and execute multiple sets of instructions which may be embodied as a computer program product stored on a non-transitory computer-readable storage medium (e.g., such as memory 214). Some non-limiting examples of instructions are described in the processes below and illustrated in the drawings. These and other instructions may be executed in any suitable sequence unless otherwise stated. The instructions and the example processes described below are merely embodiments and are not intended to be limiting.

The processor 212 may include a trusted execution environment (TEE) 216. FIG. 2 illustrates an example of how TEE 216 and processor 212 may interact. For example, processor 212 generally may be embodied as a rich execution environment having open software applications stored in memory and an embedded operating system (OS) stored in memory and executable by processor 212, whereas the TEE 216 may comprise trusted software applications, a trusted operating system (IS), and trusted memory (e.g., the memory may be partitioned in both hardware and software). Trusted software applications may be stored in the trusted memory and may be executed exclusively by the trusted operating system. The trusted software applications may comprise a data privacy system that used private-public key pair, wherein the memory securely stores one or more (cryptographic) private keys and their corresponding public or secondary keys. As described more below, the TEE 216—via processor 212—may (i) process the image data to extract or partition personal data from the image data utilizing a classifier, (ii) in the event the confidence score of the existence of personal data is below a threshold (or at all times), exchange the extracted or partitioned personal data and/or the non-personal data with a corresponding TEE of a trusted third party for merging, partitioning, or processing described herein, and (iii) receive back from the TEE of the trusted third party the results of the margining, partitioning, or processing performed by the TEE of the trusted third party.

Memory 214 may comprise volatile and/or non-volatile memory devices. Non-volatile memory devices may comprise any non-transitory computer-usable or computer-readable medium, storage device, storage article, or the like that comprises persistent memory (e.g., not volatile). Non-limiting examples of non-volatile memory devices include: read-only memory (ROM), erasable programmable read-only memory (EPROM), electrically erasable programmable read-only memory (EEPROM), optical disks, magnetic disks (e.g., such as hard disk drives, floppy disks, magnetic tape, etc.), solid-state memory (e.g., floating-gate metal-oxide semiconductor field-effect transistors (MOSFETs), flash memory (e.g., NAND flash, solid-state drives, etc.), and even some types of random-access memory (RAM) (e.g., such as ferroelectric RAM). According to one example, non-volatile memory devices may store one or more sets of instructions which may be embodied as software, firmware, or other suitable programming instructions executable by processor(s) 212—including, but not limited to, the instruction examples set forth herein.

Volatile memory devices may comprise any non-transitory computer-usable or computer-readable medium, storage device, storage article, or the like that comprises nonpersistent memory (e.g., it may require power to maintain stored information). Non-limiting examples of volatile memory include: general-purpose random-access memory (RAM), static RAM (SRAM), dynamic RAM (DRAM), or the like.

Communication system 208 may comprise electronic circuitry (and/or programmed/programmable software) to facilitate wired communication, wireless communication, or both. For example, communication system 208 may comprise a wireless chipset for short-range (e.g., Wi-Fi, Bluetooth, etc.) wireless communication or long-range (e.g., cellular, satellite, etc.) wireless communication. Further, communication system 208 may comprise a wired interface having a port so that a trained technician physically may connect a service computer to the port and download protected personal and/or non-personal data from memory 214. Other aspects of communication system 208 also are contemplated herein.

The sensor 210 may refer to one sensor or multiple sensors. The sensor 210 may comprise any suitable electronic hardware which may gather sensor data of its surroundings. Non-limiting examples of sensor 210 are provided above, such as camera configured to generate image or video data, lidar, radar, an infrared camera, a short-, medium-, or long-range thermal imaging sensor, a millimeter radar sensor, a sonar sensor (e.g., an ultrasonic sensor), etc. As shown, sensor 210 may communicate unsegregated data to computer 206, which in turn may alter the unsegregated data before providing it to communication system 208—e.g., computer 206 may mask the data, may separate the personal data from the non-personal data, may encrypt the data, may execute a combination of these tasks, etc.

Sensor data may refer to any suitable image data, a plurality of data points of a lidar sensor, a plurality of data points of a millimeter radar sensor, a plurality of data points of a sonar sensor, a plurality of data points of a thermal image, or the like. Image data may refer to digital images of a digital camera sensor, elements of digital images (e.g., pixels or groups of pixels), a frame of video, or the like. Non-personal data may be embodied in sensor data, and personal data may be embodied in image data and some other forms of sensor data.

The local computer system 202 may communicate with the backend computer system 204 via a wired and/or wireless communication network 220. The backend computer system 204 may communicate with other backend computer systems 204 or other computer systems described herein via the communication network 220. Communication network 220 may comprise public or private telephony infrastructure, cable communication infrastructure, cellular tower and base station infrastructure, satellite and satellite base station infrastructure, and/or the like. The communication network 220 is configured to establish communication with communication system 208 to receive data from the local computer system 202. In the example in which the local computer system 202 is onboard a vehicle (e.g., vehicle 100), the communication network 220 may be configured to facilitate dedicated short range communications (DSRC) service or the like to allow for communication between the vehicle 100 and other vehicles 106 and/or RSUs 108. The other vehicles 106 and/or RSUs 108 may have their own data collection systems (e.g., capturing images, performing image recognition, determining presence of personal data, etc.) and can therefore more generally be referred to as other data collection entities 222. The other data collection entities 222 can have structure (e.g., processors, communication systems, sensors, etc.) similar to the local computer system 202 onboard the vehicle 100 and are therefore not described further.

According to one example, the backend computer system 204 comprises one or more processors 224, storage 226 and memory 228. The processor(s) 224 may be similar to processor 212, described above; therefore, this hardware will not be re-described in detail for sake of brevity. At least some of the instructions executed by processor(s) 224 may differ from those executed by processor(s) 212—as will be illustrated in the flow diagrams which follow. The processor 224 may have a TEE 230, also referred to as a backend TEE. The TEE 230 and processor 224 may interact as similarly described above. For example, processor 224 may be embodied as a rich execution environment having open software applications and an embedded operating system (OS), whereas TEE 230 may comprise trusted software applications, a trusted operating system (OS), and trusted memory (e.g., memory which may be partitioned in both hardware and software). In one embodiment, the processor 224 may execute instructions stored in memory 228, while the TEE 230 comprises separate trusted memory separate from memory 228.

Storage 226 may store a database of information relating to objects for comparison with the image data sensed by the image sensor 210. For example, if the image sensor 210 is a camera configured to generate visible-light images of people, the storage 226 may include an associated database of personal data (e.g., faces, etc.) of persons. The processor 224 may classify objects in the images and store the images and the associated classifications in database 226. In embodiments, the database in storage 226 is trusted memory such that it can only be accessed by TEE 230 to allow the TEE 230 to perform any comparison between the decrypted personal data and the stored personal data, for example.

As explained above, the TEE 216 of the local computer system 202 may communicate personal data with the TEE 230 of the trusted third party 204. This may be performed in the following manner, according to one embodiment. The backend TEE 230 may provide the vehicle's TEE 216 with a cryptographic key such that any image data exchanged can only be decrypted using the key. Then, the vehicle can transfer image data to the backend TEE 230 via network 220, at which point the backend TEE 230 can decrypt the image data utilizing the cryptographic key. A similar process can be performed when transferring image data back from the backend TEE 230 to the vehicle's TEE 216, and/or to/from other data-collection entities 222.

The backend computer system 204 may also rely on a Multi-Party Computation (MPC) framework with multiple computers for masking computation of personal data. In an embodiment, at least a first input (e.g., one or more random masks) from one of the computers is received, at least a second input (e.g., one or more random masks) from a second (different) computer is received, and the masking computation uses the first and second inputs to determine an output (e.g., shares of masked data), wherein each of the first and second computers receive an output (e.g., the first computer receives a first portion of a set of shares of masked data and the second computer receives a different, second portion of the set of shares of masked data, wherein the shares of the first portion may be exclusive of the shares of the second portion). According to this framework, the first computer cannot decipher the original personal data without the share(s) of the second computer (which it does not have), or vice-versa. Thus, any data breach (e.g., due to a malicious attack) cannot decipher the personal data of the first computer (even if the data breach includes acquiring the shares of the first computer). The data is similarly protected if a data breach of the second party occurs. It should be appreciated that parties to an MPC framework themselves cannot access the data without consent among all or a quorum of the parties that this should be allowed. Accordingly, the use of the MPC framework can be compliant with GDPR or CCPA.

In this manner, experienced humans may analyze and label personal data therein. Labeling of data may refer to any suitable classification technique which categorizes objects for computer analysis. For example, in the context of autonomous driving modes, determining a labeling may include associating an identifier with vehicles, lane markers, pedestrians, etc., as well as labeling personal data and the portion of sensor data associated with the personal data. To illustrate the latter example, consider image data of a surroundings of a vehicle. The image data may comprise a license plate number of another vehicle which is on a roadway; the vehicle, the roadway, and the license plate number each may be associated with a label; further, the pixel data associated with each of the vehicle, the roadway, and the license plate number also may be identified. Continuing with the example above, once labeled at a trusted third party entity, the fact that the vehicle had a license plate may be stored (i.e., based on its label); however, the characters which identify the license plate and/or its owner may be hidden (e.g., to promote compliance with privacy laws). The trusted third party may re-mask this labeled (personal) data and re-share it (i.e., send it back to computers such as backend computer 204—thereby promoting compliance with privacy laws. Sensor data comprising masked (e.g., hidden) personal data may be useful to engineering software models using real-world scenarios to simulate and train autonomous driving computers. Further, by securely hiding the personal data, engineering may be compliant with local, regional, and/or global data privacy laws.

The trusted third party and/or any backed computer system or third party computer system may comprise a server having one or more processors and memory such as those described above. Such a server may be configured to execute software applications that extract or identify—at least in part—personal data and perform labeling functions of the personal data.

Figure 3A:
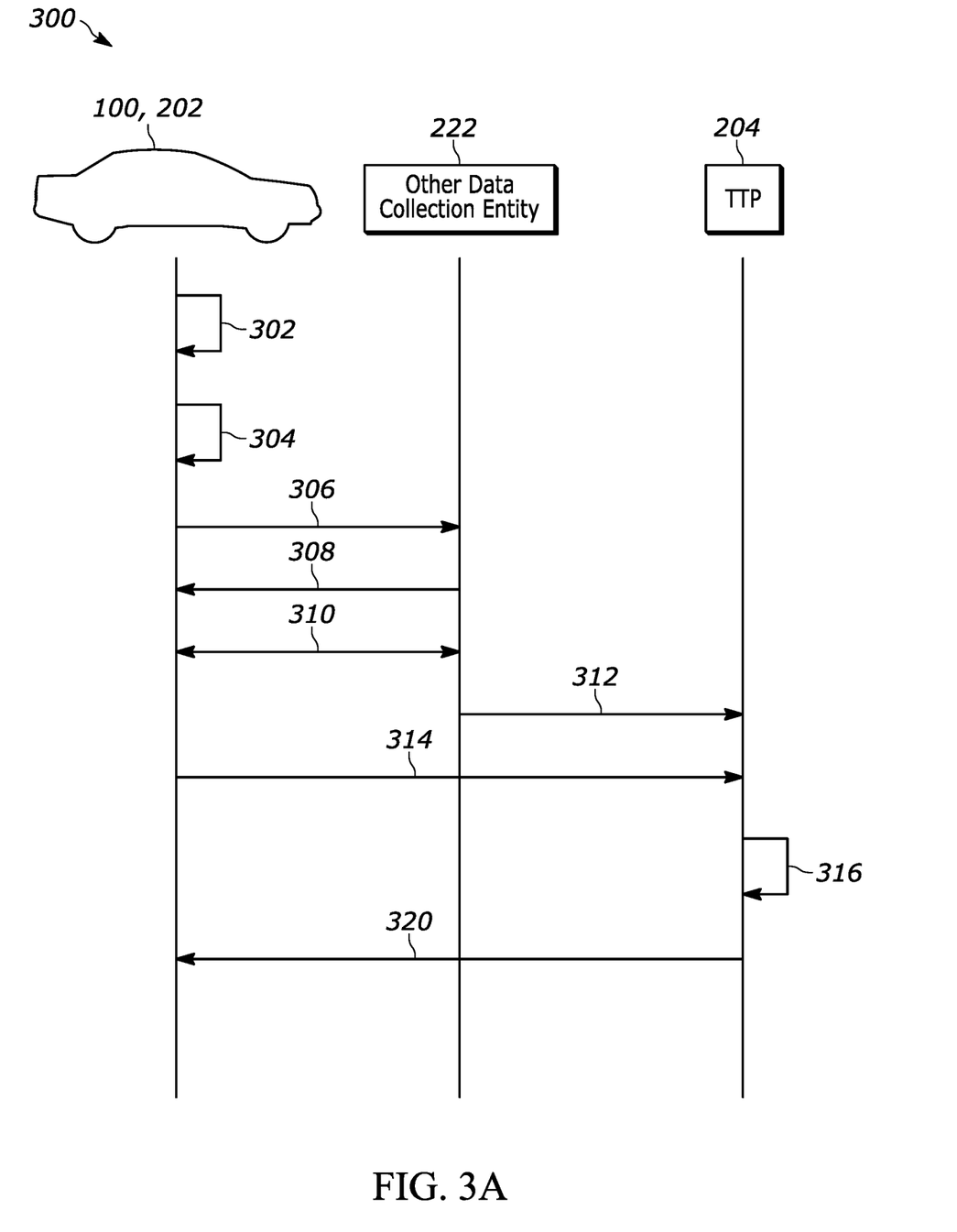
FIG. 3A is a flow diagram illustrating a process of using the data privacy system, according to an embodiment.

Turning now to FIG. 3, a method 300 is shown illustrating the systems described herein for leveraging functionality and components used in collaborative sensing between a vehicle (e.g., vehicle 100) and another data collection entity 222. The methods described herein leverage communication and fusion methods employed for collaborative sensing to increase quality of partitioning of image data into personal data and non-personal data. At 302, the vehicle 100—more specifically, its local computer system 202—captures image data of an object, such as a pedestrian or other VRU. The captured images can include one or more still images, or a collection of images in a video format. Other image data can be captured at 302 depending on the type of image sensor 210 utilized, as described above.

At 304, the local computer system 202 attempts to partition the image data into personal data and non-personal data. As mentioned above, this step is performed at the vehicle by the local computer system 202; however, in other embodiments, this step is performed remote from the vehicle 100. In the illustrated embodiment, the local computer system 202 attempts the partitioning. This can be performed utilizing the processor 212 (e.g., TEE 216) to operate a classifier function to classify certain regions as personal data or non-personal data. The classifier can also return a confidence score regarding the detection of personal data. In some circumstances, as explained above, the VRU (e.g., pedestrian) may be hidden or obstructed from view of the image sensor 210 such that the local computer system 202 has difficulty in performing an accurate partitioning of personal data and non-personal data. Thus, the classifier function performed by the processor 212 may return a low confidence score.

When the confidence value is below a threshold, the method may proceed to 306 to leverage the similar classification operations performed by other data collection entities 222. Alternatively, the proceeding to 306 may be all the time, e.g., without relying on the confidence being below a threshold. In such an embodiment, the vehicle 100 can communicate with the other data collection entities 222 without regard for the confidence of its own local computer system 202 in being able to produce accurate partitioning; this can still increase (or at least confirm) the accuracy of the partitioning.

At 306, to improve the quality of the partitioning, the local computer system 202 outputs a broadcast message to all data collection entities in the vicinity of the vehicle 100. For example, utilizing network 220, the communication system 208 can communicate with a corresponding communication system of other data collection entities in range. As described above, this may be based on DSRC communication systems. In other embodiments, the network 220 provides for communication via ITS-G5, IEEE-801.11p, PC5, or other wireless communication protocols. The broadcast message output by the local computer system 202 includes a request by the vehicle for the other data collection entities 222 to indicate whether they detect personal data in their sensor data relating to a scene specified by the vehicle. For example, the broadcast message may include location data, time stamp data, line of sight information, and other similar data to inform the other data collection entity 222 which area of interest the vehicle 100 is concerned with. This information may include, for example, a particular location of a pedestrian at a particular time. If the methods described herein are performed by a backend or edge system, other communication methods and partners can also be used, such as IP-based communication with other backend systems or edge systems.

Entities that receive that broadcast message from the vehicle 100 can then perform personal data detection on their existing image data corresponding to the time and location indicated in the broadcast message. For example, the data collection entity 222 in communication with the vehicle 100 can retrieve image data stored in memory or database (or live image data) of a particular location at a particular time as indicated in the broadcast message output by the vehicle.

At 308, the data collection entity 222 sends a message to the vehicle 100 regarding the existence—or non-existence—of personal data. In the event no personal data is detected by the data collection entity 222, the vehicle 100 is notified about the lack of personal data being detected. In response to receiving this notification, the local computer system 202 of the vehicle 100 performs a pre-defined action. The pre-defined action selected for performance may depend on the confidence value of its own personal data detection. For example, if no personal data is detected by the other data collection entities 222, the local computer system 202 may perform a first action if the confidence of the existence of personal data is below a threshold, and perform a second action if the confidence of the existence of personal data is above the threshold. The actions taken by the local computer system 202 may include, for example, deletion of the image data, treating the whole image as personal-data contaminated, treating the whole image as not comprising personal data, or the like. Performing these actions allow subsequent actions to take place, such as sending the data to a backend system for long-term storage (wherein the selection of the backend system and the security measures to be utilized depend on the presence of personal data), or storing the data locally rather than deleting it directly after local usage for the task at hand, such as automated driving (in the case no personal data is detected).

In the event personal data is detected by the data collection entity 222, then the message sent to the vehicle 100 at 308 can include information or a notification regarding the existence of personal data in the image data processed by the data collection entity 222. The vehicle 100 and other system entities can perform one of several pre-defined actions. These pre-defined actions can be programmed into the system for execution upon receiving the message at 308 containing an indication of the detection of personal data. One of the pre-defined actions can include deleting all images or image data where the vehicle did not detect the personal data but the other entities 222 have detected the personal data in the images or image data of the same scene; the deletion can occur after still having used the data only locally for the task at hand (e.g., in an autonomous driving task). Once again, location and time-stamped data can aid the collaboration such that the local computer system 202 knows exactly which time and location the personal data is detected from the other entities 222, and can delete the images or image data corresponding to that time and/or location of the image data detected locally at the vehicle 100. This can safeguard the image data detected at the vehicle 100 and delete the images even though the vehicle itself has not detected the existence of personal data being present; the fact that personal data is present as detected by the other data collection entity 222 signals the vehicle 100 and/or its local computer system 202 to delete the image data for safety.

Another pre-defined action can include flagging (rather than deleting) the images or image data where the vehicle did not detect the personal data but the other entities 222 have detected the personal data in the images or image data of the same scene.

A third example of a pre-defined action can include an attempt to merge the images or image data via a trusted third party (TTP), such as backend computer system 204 shown in FIG. 2. This can include sending of the non-personal data parts and the personal data parts of the image data to a trusted third party in a secure manner using, for example, a secure channel (e.g., based on SSL or TLS) and TEEs in the trusted third party, such as TEE 230 explained above. The trusted third party can be the backend computer system 204 explained above, or an edge server, or the like.

For example, at 310, the vehicle 100 and the other data collection entity 222 can communicate via network 220 to agree on a mutually trusted third party 204. This can be certificate-based, for example, with both the vehicle 100 and the other data collection entity 222 having one or more common entities provided with a digital certificate granting access of use. Once a mutually trusted third party is selected by the vehicle 100 and the other data collection entity 222, then at 312 the data collection entity 222 sends any personal data and non-personal data in the relevant scene to the TTP 204. Meanwhile, at 314, the vehicle 100 (e.g., its local computer system 202) also sends any personal data and non-personal data in the relevant scene to the TTP 204. The sending of personal and non-personal data at 312 and 314 to the TTP 204 can be performed in a secure manner using secure communications and a TEE 230 within the TTP 204.

Once the TEE 230 of the TTP 204 has received the personal data partitions from the image data, the TEE 230 can merge the personal data at 316. This can include, for example, comparing and combining the personal data such that the resulting personal data partition comprises all personal data sent to the TTP 204. The result can include all personal data taken from the vehicle 100 and all data collection entities 222 of the relevant scene in a combined data group. Also within the TEE 230, the non-personal data partitions can be merged such that all parts of the newly-merged personal data partition still included in any of the original non-personal data partitions are removed. The result is all non-personal data taken from the vehicle 100 and all data collection entities 222 of the relevant scene in a combined data group, having no personal data. At 320, the TTP 204 securely transfers the merged personal data and the merged non-personal data partitions to the vehicle 100. The TTP 204 can also send the merged personal data and the merged non-personal data partitions to the other data collection entities 222, and other entities (e.g., machine-learning training systems, etc.). The vehicle can use the combined personal data and non-personal data in a variety of settings. For example, the vehicle system can crop personal data from the merged set to treat the resulting partitions differently, e.g., to securely store the personal data part and less-securely store the non-personal data part. In another example, the vehicle can utilize long-term storage for purposes other than the current usage of the data—e.g., data collected for detecting VRUs while driving can be stored in non-personal-data form for training neural networks for other purposes. Here the presence or non-presence of personal data can be used to select storage systems and security measures.

Figure 3B:
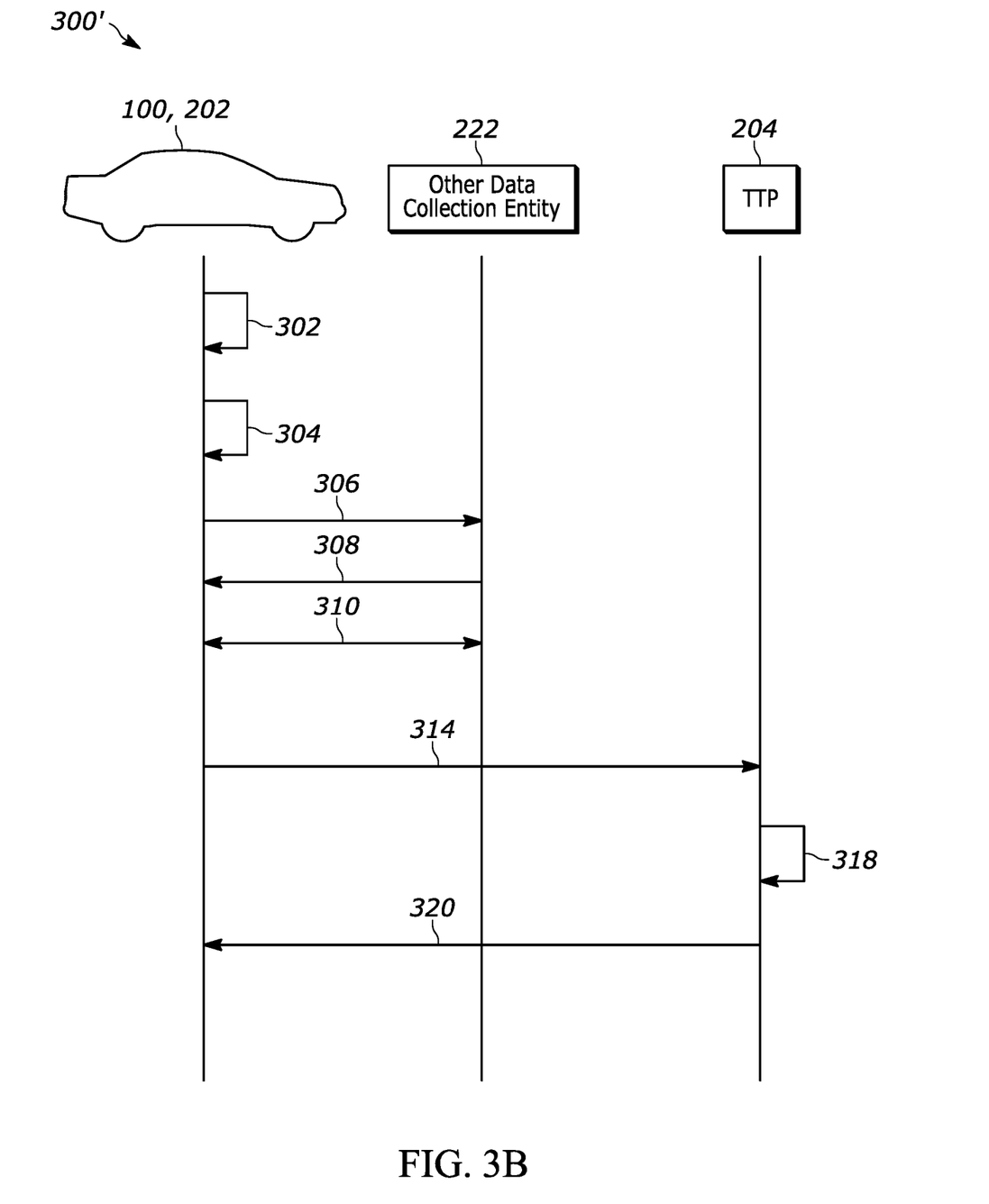
FIG. 3B is another flow diagram illustrating a process of using the data privacy system, according to an embodiment.

FIG. 3B shows another method 300' of utilizing the systems described herein for leveraging functionality and components used in collaborative sensing between a vehicle (e.g., vehicle 100) and another data collection entity 222. The method 300' is identical to the method 300 of FIG. 3A up until the notification at 308 is received by the vehicle 100 indicating the existence of personal data in the image data processed by the data collection entity 222. In this method 300', a fourth example of a pre-defined action that can take place in response to receiving this notification at 308 is illustrated. In this fourth example of a pre-defined action, at 318, the TTP 204 is used for classification. For example, once the message at 308 indicates the presence of personal data, at 310 the vehicle 100 and the other data collection entity 222 can agree on a trusted third party 204. Then, at 314, the vehicle 100 (e.g., its local computer system 202) also sends any personal data and non-personal data in the relevant scene to the TTP 204. Note that in this method 300', step 312 is not present according to an embodiment. Once the vehicle 100 has sent its image data to the TTP 204, at 318 the TTP 204 performs its own classification and partitioning of the image data into personal data partitions and non-personal data partitions. In other words, the TTP 204 itself decides whether personal data is present, and segregates the personal data from the non-personal data. At 320, the TTP 204 sends back to the vehicle 100 in a secure fashion the result of its partitioning in the form of a list of parameters indicating partitions (e.g., a list of pixel positions of pixels classified as representing personal data).

Figure 4:
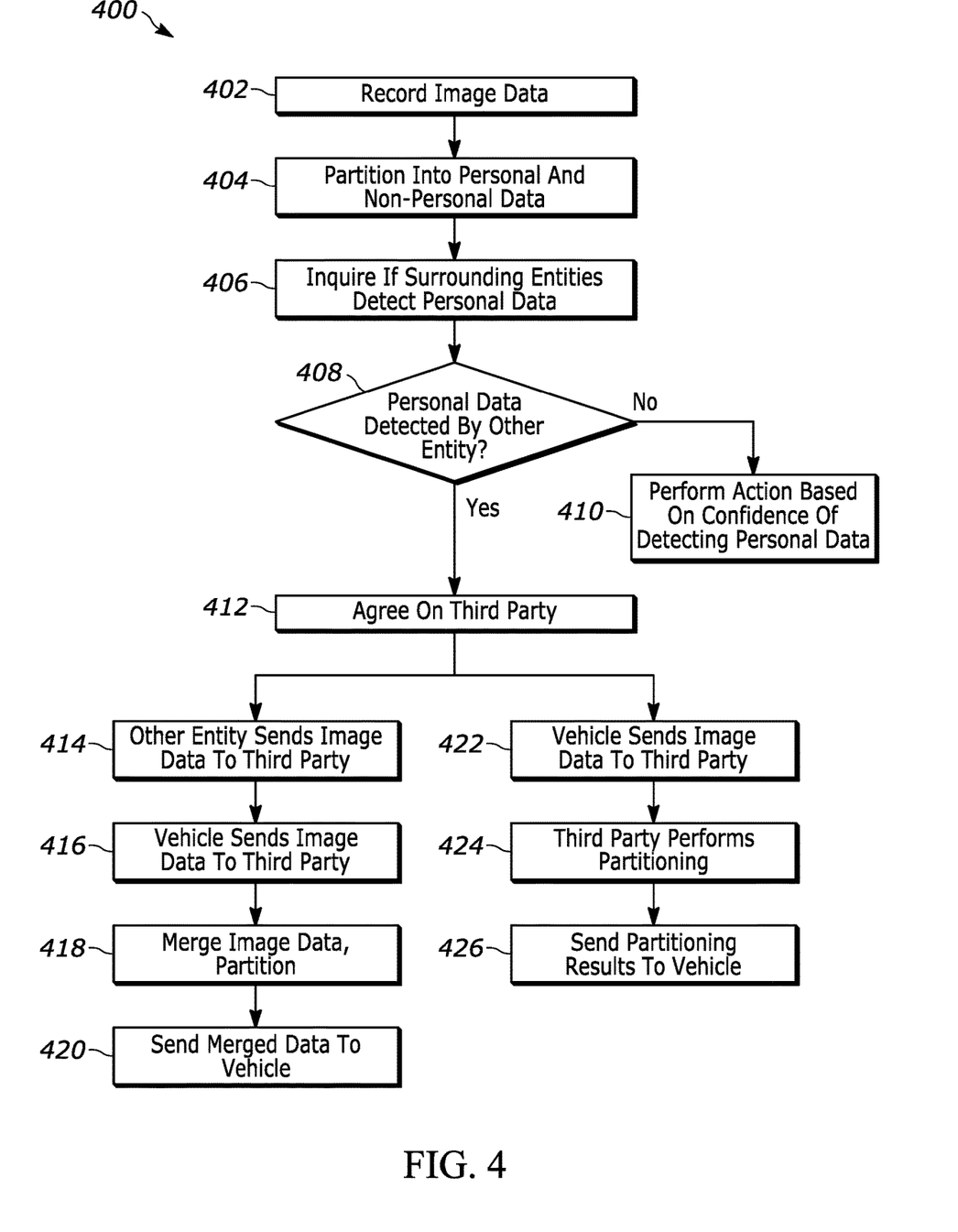
FIG. 4 is a flowchart illustrating a processing of using the data privacy system, according to an embodiment.

FIG. 4 illustrates a flowchart of a method 400 for detecting and protecting personal data, according to an embodiment. The structure described herein can be used to perform the steps of FIG. 4.

At 402, the vehicle 100 records image data. This can be in the form of video, or other forms of images as described above, utilizing image sensor 210. At 404, the vehicle 100 (e.g., its local computer system) attempts to partition or separate the image data into personal data and non-personal data according to the methods described above. At 406, the vehicle 100 broadcasts a message (e.g., via DSRC for example) to inquire whether any surrounding entity (e.g., other data-collecting entities 222 such as another vehicle or a RSU) have detected personal data in an area and at a time indicated by the vehicle 100. Step 406 can be performed in response to a comparison with a confidence threshold; for example, if the vehicle outputs a confidence rating below a threshold (wherein the confidence rating is the confidence of its own system that the detected personal data is indeed personal data), the method can proceed to 408 to leverage other data collection entities.

At 408, if no personal data is detected by another entity 222, then the vehicle 100 can perform a prescribed action. This prescribed action may be based on the vehicle's own confidence level in personal data being present in the image data. For example, if the confidence level exceeds a threshold, the vehicle can delete the image data that contains the personal data.

If personal data is indeed detected by another entity 222, then the method proceeds to 412 in which the vehicle 100 and the other data collection entity 222 agree on a trusted third party (TTP). Once a TTP is mutually agreed upon, the method can proceed in one of two ways, either following steps 414-420 or following steps 422-426, exemplifying two different embodiments.

At 414, the other entity 222 sends the image data it has recorded to the TTP. The vehicle 100 also sends the image data it has recorded to the TTP at 416. At 418, the TTP merges the image data from the vehicle 100 and the other entity 222 so that all of the personal data is segregated from the non-personal data. At 420, the merged data (including the partitioned personal data) can be sent to the vehicle 100 for further action, or to another entity for image-recognition machine learning processing, for example.

If the method proceeds at 422, first the vehicle sends the image data to the TTP. Then at 424, the TTP performs the partitioning. This allows the vehicle to leverage its communication with the TTP to perform the partitioning rather than the vehicle itself, increasing the confidence. At 426, the results of the partitioning are sent back to the vehicle 100.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method of leveraging multiple data-collection entities to protect personal data, the method comprising:
    capturing image data via an image sensor of a vehicle, wherein the image sensor is one or more of a digital camera, lidar sensor, infrared camera, short-, medium- or long-range thermal imaging sensor, radar sensor, sonar sensor, distance sensor, or motion sensor;
    via a classifier, partitioning the captured image data into personal data and non-personal data;
    via the classifier, assigning a confidence score to the personal data, wherein the confidence score represents the classifier's confidence in an accuracy of the partitioned personal data indeed being personal data;
    in response to the confidence score being below a threshold, broadcasting a wireless signal to one or more other data-collection entities, wherein the wireless signal includes a request for the one or more other data-collection entities to inform the vehicle if the one or more data-collection entities has detected personal data at a time corresponding to when the image sensor of the vehicle captured the image data;
    in response to the one or more other data-collection entities indicating it has detected personal data at the time, performing one or more pre-defined actions at the vehicle; and
    in response to the one or more other data-collection entities indicating it has not detected personal data at the time, performing one or more other pre-defined actions at the vehicle.

2. The method of claim 1, wherein the one or more predefined actions include:
    at the vehicle, deleting all images captured at a time in which the classifier did not detect personal data but the one or more other data-collection entities did detect personal data.

3. The method of claim 1, wherein the one or more predefined actions include:
    at the vehicle, flagging all images for later processing that were captured at a time in which the classifier did not detect personal data but the one or more other data-collection entities did detect personal data.

4. The method of claim 1, wherein the one or more predefined actions include:
    mutually agreeing on a trusted third party between the vehicle and the one or more other data collection entities;
    sending the captured image data from the vehicle to the trusted third party; and
    receiving merged image data from the trusted third party, wherein the merged image data includes partitioned personal data captured from the image sensor of the vehicle and partitioned personal data captured form the one or more other data-collection entities.

5. The method of claim 1, wherein the one or more predefined actions include:
    mutually agreeing on a trusted third party between the vehicle and the one or more other data collection entities;
    sending the captured image data from the vehicle to the trusted third party; and
    receiving partitioning results from the trusted third party, wherein the partitioning results include processed image data in which the trusted third party has partitioned into personal data and non-personal data.

6. The method of claim 1, wherein the classifier is executed via a vehicle processor.

7. The method of claim 1, wherein the classifier is executed via a processor remote from the vehicle.

8. The method of claim 1, wherein the request includes vehicle location data, enabling the one or more data-collection entities to process images captured at a location corresponding to the vehicle location data.

9. A system for leveraging multiple data-collection entities to protect personal data, the system comprising:
    a first data collection entity including (i) a first image sensor configured to capture first images of a first scene, and (ii) a first processor programmed to execute a first classifier to process first image data associated with the first images and partition personal data from non-personal data associated with the first image data; and a second data collection entity including (i) a second image sensor configured to capture second images of a second scene, and (ii) a second processor programmed to execute a second classifier to process second image data associated with the second images and partition personal data from non-personal data associated with the second image data;

wherein the first processor is programmed to:
broadcast, to one or more of the multiple data-collection entities, including the second data collection entity, a wireless message including a request for the second data collection entity to indicate whether the second processor detected personal data at a particular time specified by the first processor,
in response to the second data collection entity indicating that no personal data was detected at the particular time, perform a first predefined action, and
in response to the second data collection entity indicating that personal data was detected at the particular time, perform a second predefined action;

wherein each of the first and second image sensors is one or more of a digital camera, lidar sensor, infrared camera, short-, medium- or long-range thermal imaging sensor, radar sensor, sonar sensor, distance sensor, or motion sensor.

10. The system of claim 9, wherein the first predefined action is one of a plurality of actions selected based on a confidence score output by the first classifier representing the classifier's confidence in an accuracy of the partitioned personal data indeed being personal data.

11. The system of claim 9, wherein the first predefined action is (i) deletion of the first image data that contains the personal data, or (ii) marking the first image data as not containing personal data.

12. The system of claim 9, wherein the second predefined action includes deleting all images associated with the particular time in which the first data collection entity did not detect personal data but the second data collection entity did detect personal data.

13. The system of claim 9, wherein the second predefined action includes flagging, for later processing, all images associated with the particular time in which the first data collection entity did not detect personal data but the second data collection entity did detect personal data.

14. The system of claim 9, wherein the second predefined action includes:
agreeing with the second data collection entity on a trusted third party,
sending the first image data associated with the particular time to the trusted third party for partitioning, and
receiving, from the trusted third party, results of the partitioning by the trusted third party.

15. The system of claim 14, wherein the first processor includes a first trusted execution environment (TEE), and the trusted third party includes a second TEE, wherein the first TEE is configured to encrypt the first image data with a key that allows only the second TEE to decrypt the first image data for partitioning.

16. The system of claim 14, wherein the second predefined action includes:

sending the second image data associated with the particular time to the trusted third party, and
receiving, from the trusted third party, merged data that includes partitioned personal data from the first data collection entity and partitioned personal data from the second data collection entity.

17. The system of claim 9, wherein the first classifier is configured to output a confidence score regarding a confidence of the existence of personal data in the first image data, and wherein the first processor is programmed to perform the broadcast in response to the confidence score being below a threshold.

18. A non-transitory computer-readable medium comprising a plurality of instructions that, when executed by one or more processors of a first data collection entity, cause the one or more processors to perform the following:
capture image data via an image sensor, wherein the image sensor is one or more of a digital camera, lidar sensor, infrared camera, short-, medium- or long-range thermal imaging sensor, radar sensor, sonar sensor, distance sensor, or motion sensor;
via a classifier, partition the captured image data into personal data and non-personal data;
via the classifier, assign a confidence score to the partitioned personal data, wherein the confidence score represents the classifier's confidence in an accuracy of the partitioned personal data indeed being personal data;
in response to the confidence score being below a threshold, broadcast a wireless signal including a request for one or more other data collection entities to inform the first data collection entity whether personal data has been detected by the one or more other data collection entities at a particular time designated by the first data collection entity; and
in response to the one or more other data collection entities indicating the presence of personal data at the particular time:
agree with the one or more other data collection entities on a mutually trusted third party,
select the trusted third party;
send the image data from the first data collection entity to the trusted third party for partitioning into personal data and non-personal data, and
receive results of the partitioning from the trusted third party.

19. The non-transitory computer-readable medium of claim 18, wherein the one or more processors includes a first trusted execution environment (TEE), and the trusted third party includes a second TEE, wherein the first TEE is configured to encrypt the first image data with a key that allows only the second TEE to decrypt the first image data for partitioning.

20. The non-transitory computer-readable medium of claim 18, wherein the instructions when executed by one or more processors cause the one or more processors to:
delete images that contain personal data as indicated by the results of the partitioning from the trusted third party.

* * * * *